United States Patent
He et al.

(10) Patent No.: US 11,578,251 B2
(45) Date of Patent: Feb. 14, 2023

(54) AMPHIPHILIC BLOCK POLYMER ULTRALOW-PERMEABILITY AGENT AND INTELLIGENT TEMPORARY PLUGGING TYPE WATER-BASED DRILLING FLUID

(71) Applicant: China University of Petroleum (Beijing), Beijing (CN)

(72) Inventors: Yinbo He, Beijing (CN); Guancheng Jiang, Beijing (CN); Lili Yang, Beijing (CN); Tengfei Dong, Beijing (CN); Bin Tan, Beijing (CN); Rongchao Cheng, Beijing (CN); He Shi, Beijing (CN); Jianguo Zhang, Beijing (CN); Tie Geng, Beijing (CN); Jiansheng Luo, Beijing (CN); Dongmin Jia, Beijing (CN); Kai Wang, Beijing (CN); Chunlin Xie, Beijing (CN); Wuquan Li, Beijing (CN); Xiaoqing Li, Beijing (CN)

(73) Assignee: China University of Petroleum (Beijing), Beijing (CN)

( * ) Notice: Subject to any disclaimer, the term of this patent is extended or adjusted under 35 U.S.C. 154(b) by 0 days.

(21) Appl. No.: 17/696,549

(22) Filed: Mar. 16, 2022

(65) Prior Publication Data
US 2022/0204833 A1 Jun. 30, 2022

Related U.S. Application Data

(62) Division of application No. 17/350,849, filed on Jun. 17, 2021, now abandoned.

(30) Foreign Application Priority Data

Aug. 12, 2020 (CN) .......................... 202010807707.9

(51) Int. Cl.
| | | |
|---|---|---|
| C09K 8/508 | (2006.01) | |
| C08F 212/08 | (2006.01) | |
| C08F 222/08 | (2006.01) | |
| C08L 33/26 | (2006.01) | |
| C09K 8/512 | (2006.01) | |

(52) U.S. Cl.
CPC .......... *C09K 8/5083* (2013.01); *C08F 212/08* (2013.01); *C08F 222/08* (2013.01); *C08L 33/26* (2013.01); *C09K 8/512* (2013.01)

(58) Field of Classification Search
None
See application file for complete search history.

(56) References Cited

U.S. PATENT DOCUMENTS

| 4,507,210 A * | 3/1985 | Lauzon ................. E21B 43/025 106/900 |
| 4,602,067 A * | 7/1986 | Stong ....................... C09K 8/24 525/327.4 |
| 2006/0260812 A1 | 11/2006 | Eoff et al. |
| 2011/0110989 A1 | 5/2011 | Simonnet et al. |
| 2018/0201821 A1 * | 7/2018 | Jiang ..................... C07C 311/09 |

FOREIGN PATENT DOCUMENTS

| CN | 101735777 A | 6/2010 |
| CN | 102453470 A | 5/2012 |
| CN | 103396284 A | 11/2013 |
| CN | 103525379 A | 1/2014 |
| CN | 104448126 A | 3/2015 |
| CN | 104610485 A | 5/2015 |
| CN | 105017474 A | 11/2015 |

(Continued)

OTHER PUBLICATIONS

Cao, Lijuan, et al., "Surfactant-Free Emulsion Polymerization of Methyl Methacrylate Initiated by α-methyl Styrene-Maleic Anhydride Copolymer Macroinitiator," Acta Polymerica Sinica, No. 01, Jan. 20, 2012, pp. 75-82.

(Continued)

*Primary Examiner* — Jeffrey D Washville
(74) *Attorney, Agent, or Firm* — Calfee Halter & Griswold LLP

(57) ABSTRACT

The invention relates to the technical field of oil and gas drilling, and discloses an amphiphilic block polymer ultralow-permeability agent and an intelligent temporary plugging type water-based drilling fluid. The ultralow-permeability agent contains a structural unit provided by styryl hydrophobic monomer, maleic anhydride and acrylamide; the drilling fluid contains two or more of water, sodium bentonite, Pac-Lv, the ultralow-permeability agent, calcium carbonate, one-way plugging agent, white asphalt and barite which are stored in a mixed manner or independently stored. When the amphiphilic block polymer provided by the invention is used as the ultralow-permeability agent of the intelligent temporary plugging type water-based drilling fluid, the self-adaptive characteristic is realized; according to the amphiphilic block polymer, temporary plugging layer gaps formed in pore and throats by plugging materials in drilling fluid can be fully filled under the condition that the sizes and the distribution of the pore and throats of reservoirs are not required to be clear, so that the permeability of temporary plugging layer is greatly reduced, ultralow-permeability is realized, and the amphiphilic block polymer is weak in tackifying effect, has gel-improving effect and can improve the rheological property of the drilling fluid.

4 Claims, No Drawings

(56) References Cited

FOREIGN PATENT DOCUMENTS

| CN | 105367710 A | 3/2016 |
| CN | 106220797 A | 12/2016 |
| CN | 106565921 A | 4/2017 |
| CN | 108264587 A | 7/2018 |
| CN | 110387016 A | 10/2019 |
| CN | 110396152 A | 11/2019 |
| CN | 110922955 A | 3/2020 |
| EP | 2690153 A1 | 1/2014 |

OTHER PUBLICATIONS

Wang, Gang et al., "Rheology and Fluid Loss of a Polyacrylamide-Based Micro-Gel Particles in a Water-Based Drilling Fluid," Materials Express, vol. 10, No. 05, May 31, 2020, pp. 657-662.

Mao, Hui et al., "Hydrophobic Associated Polymer Based Silica Nanoparticles Composite with Core-Shell Structure as a Filtrate Reducer for Drilling Fluid at Utra-High Temperature," Journal of Petroleum Science and Engineering, vol. 129, May 31, 2015, pp. 1-14.

Ma Cheng et al., "Synthesis and Evaluation of Filtrate Reducer SPH-F for Calcium Chloride Clay-free Drilling Fluids," Drilling Fluid & Completion Fluid, vol. 31, No. 01, Jan. 30, 2014, pp. 1-3.

\* cited by examiner

AMPHIPHILIC BLOCK POLYMER ULTRALOW-PERMEABILITY AGENT AND INTELLIGENT TEMPORARY PLUGGING TYPE WATER-BASED DRILLING FLUID

CROSS REFERENCE TO RELATED APPLICATIONS

This application is a divisional application of U.S. application Ser. No. 17/350,849, filed on Jun. 17, 2021, entitled "Amphiphilic block polymer ultralow-permeability agent and intelligent temporary plugging type water-based drilling fluid", which is specifically and entirely incorporated by reference.

FIELD OF THE INVENTION

The invention relates to the technical field of oil and gas drilling, in particular to an amphiphilic block polymer and an intelligent temporary plugging type water-based drilling fluid.

BACKGROUND OF THE INVENTION

When a reservoir is drilled, the invasion of the solid phases and the liquid phases in the drilling fluid inevitably causes reservoir damage, even "kills" the reservoir, resulting in the failure of drilling and development of oil and gas reservoir.

The temporary plugging drilling fluid can quickly form a temporary plugging layer with low permeability when the reservoir is drilled, the invasion of the drilling fluid can be avoided to the maximum extent, and the temporary plugging drilling fluid is a very ideal reservoir protection drilling fluid, but the plugging material in the temporary plugging drilling fluid must strictly match the reservoir requirements, and particularly the softening point and the particle size of the deformable filling particles must strictly match the reservoir temperature and the reservoir pore and throat size, so that a compact temporary plugging layer with low permeability can be formed.

However, in most cases, the reservoir properties are complex, and the pore and throat size and distribution cannot be accurately known, so that blindness exists in the selection of the filling particles, and the formulation design of the temporary plugging drilling fluid and the performance of the drilling fluid are seriously influenced.

SUMMARY OF THE INVENTION

The invention aims to overcome the defects of the prior temporary plugging drilling fluid technology and provide an amphiphilic block polymer and an intelligent temporary plugging water-based drilling fluid suitable for the wide pore and throat size distribution reservoir, wherein the amphiphilic block polymer has the self-adaptive characteristic, can fully fill temporary plugging layer gaps formed in pore and throats by plugging materials in the drilling fluid under the condition of not knowing the pore and throat sizes and the distribution of the reservoir, and can greatly reduce the permeability of the temporary plugging layer.

In order to achieve the above object, the first aspect of the present invention provides an amphiphilic block polymer ultralow-permeability agent, which comprises structural unit A, structural unit B and structural unit C, wherein the structural unit A is provided by styryl hydrophobic monomer, the structural unit B is provided by maleic anhydride, and the structural unit C is provided by acrylamide;

the content of the structural unit A is 32 wt % to 44 wt % based on the total weight of the ultralow-permeability agent; the content of the structural unit B is 22 wt % to 28 wt %; the content of the structural unit C is 33 wt % to 40 wt %.

The second aspect of the present invention provides an intelligent temporary plugging type water-based drilling fluid which contains two or more of the following components stored in a mixed manner or independently:

water, sodium bentonite, Pac-Lv, the ultralow-permeability agent, calcium carbonate, one-way plugging agent, white asphalt and barite;

the ultralow-permeability agent is the amphiphilic block polymer ultralow-permeability agent described in the first aspect.

Compared with the existing water-based drilling fluid technology, the intelligent temporary plugging type water-based drilling fluid containing the amphiphilic block polymer provided by the invention has at least the following advantages:

(1) the amphiphilic block polymer provided by the invention can be self-assembled into nano-micron-scale deformable micelles, the micelles can form supermolecule aggregates with a wide particle size range by self-aggregation, and the temporary plugging layer gaps formed in pore and throats by plugging materials such as bridging particles can be fully filled under the condition that the pore and throat size and distribution of the reservoir are not required to be clear, so that the permeability of temporary plugging layer is greatly reduced;

(2) the amphiphilic block polymer provided by the invention has a weak tackifying effect, has a gel-improving effect and can improve the rheological property of the drilling fluid.

Additional features and advantages of the invention will be set forth in the detailed description which follows.

DETAILED DESCRIPTION OF THE EMBODIMENTS

The endpoints of the ranges and any values disclosed herein are not limited to the precise range or value, and these ranges or values should be understood to encompass values close to these ranges or values. For numerical ranges, each range between its endpoints and individual point values, and each individual point value can be combined with each other to give one or more new numerical ranges, and such numerical ranges should be construed as specifically disclosed herein.

As described above, the first aspect of the present invention provides an amphiphilic block polymer comprising the structural unit A provided by styryl hydrophobic monomer, the structural unit B provided by maleic anhydride, and the structural unit C provided by acrylamide, wherein the styryl hydrophobic monomer is selected from at least one of styrene, α-methyl styrene, 2-methyl styrene, 3-methyl styrene and 4-methyl styrene;

the content of the structural unit A is 32 wt % to 44 wt % based on the total weight of the polymer; the content of the structural unit B is 22 wt % to 28 wt %; the content of the structural unit C is 33 wt % to 40 wt %.

As described above, the second aspect of the present invention provides a composition for producing the amphiphilic block polymer, which contains two or more of the following components stored in admixture or separately:

amphiphilic block polymer, chain transfer agent, initiator, solvent and precipitant;

wherein the content of the amphiphilic block polymer is 20 parts to 24 parts by weight relative to 100 parts by weight of the solvent; the content of the chain transfer agent is 0.5 parts to 1 part by weight; the content of the initiator is 0.03 parts to 0.05 parts by weight; the content of the precipitant is 20 parts to 24 parts by weight; the amphiphilic block polymer is the amphiphilic block polymer according to the first aspect.

It should be noted that the amphiphilic block polymer referred to in the second aspect and the following aspects of the present invention are all the amphiphilic block polymer described in the first aspect of the present invention, and the description of the amphiphilic block polymer described in the first aspect will not be repeated in the following description of the present invention, and those skilled in the art should not be construed as limiting the present invention.

Preferably, the chain transfer agent is selected from at least one of 4-cyano-(thiobenzoic) pentanoic acid, 4-cyano-4-(thiobenzoyl) pentanoic acid, 4-cyanopentanoic acid dithiobenzoate.

Preferably, the initiator is selected from at least one of azobisisobutyronitrile and azobisisoheptonitrile.

The kind of the solvent used in the composition for preparing the amphiphilic block polymer according to the present invention may be various known in the art, and preferably, the solvent is selected from at least one of tetrahydrofuran and dimethylformamide.

Preferably, the precipitant is selected from at least one of petroleum ether and n-hexane.

The sources of the raw materials for the amphiphilic block polymer, the chain transfer agent, the initiator, the solvent and the precipitant are not particularly limited in the present invention, and various commercially available products can achieve the aforementioned object of the present invention.

As previously mentioned, the third aspect of the present invention provides a method for preparing the amphiphilic block polymer according to the first aspect, the method comprising: in the presence of protective gas, (1) the weight ratio of the dosage is 1:0.02-0.04:0.004-0.008 of the styryl hydrophobic monomer I, the chain transfer agent contact with the initiator to carry out the first reaction to obtain the first intermediate;

(2) in the presence of a solvent, contacting the first intermediate with the styryl hydrophobic monomer II, maleic anhydride, acrylamide and the initiator to perform the second reaction to obtain the second intermediate, wherein the first intermediate, the styryl hydrophobic monomer II, the maleic anhydride and the acrylamide are used in the weight ratio of 1:2.9-3.5: 2.5-3.0:4.0-4.9;

(3) contacting the second intermediate with the precipitant to effect precipitation;

the styryl hydrophobic monomer I and the styryl hydrophobic monomer II provide the structural unit A of the amphiphilic block polymer as described in the first aspect above. That is, in the aforementioned preparation method of the present invention, the styryl hydrophobic monomer is added to the reaction system in at least two portions.

In the present invention, the protective gas is preferably nitrogen.

Preferably, the weight ratio of the first intermediate, the solvent and the initiator is 1:90-110:0.02-0.04.

Preferably, the weight ratio of the second intermediate to the precipitant is 1:0.83-1.2.

Preferably, in step (1), the conditions of the first reaction at least satisfy: the temperature is 40-80° C., and the time is 16-24 h; more preferably, the conditions of the first reaction at least satisfy: the temperature is 50-70° C. and the time is 18-22 h.

Preferably, in step (2), the conditions of the second reaction at least satisfy: the temperature is 40-80° C., and the time is 16-24 h; more preferably, the conditions of the second reaction at least satisfy: the temperature is 50-70° C. and the time is 18-22 h.

Preferably, in step (3), the conditions for precipitation at least satisfy: the temperature is 25-28° C., and the time is 0.2-0.4 h; more preferably, the conditions for precipitation at least satisfy: the temperature is 25-26° C., and the time is 0.2-0.3 h.

In the present invention, according to a preferred embodiment, the method for preparing the polymer comprises the steps of:

(4) according to the weight ratio of 1:0.02-0.04:0.004-0.008, weighing styrene I, 4-cyano-(thiobenzoic) pentanoic acid and azobisisobutyronitrile, mixing in a three-neck flask, vacuumizing and filling with protective gas (such as nitrogen), and stirring at 50-70° C. for 18-22 h to obtain the first material;

(5) mixing the first material with styrene II, maleic anhydride, acrylamide and azobisisobutyronitrile in the presence of tetrahydrofuran, wherein the weight ratio of the first material to the styrene II to the maleic anhydride to the acrylamide to the tetrahydrofuran to the azobisisobutyronitrile is 1:2.9-3.5:2.5-3.0:4.0-4.9: 90-110:0.02-0.04, vacuumizing and filling with protective gas (such as nitrogen), and stirring at 50-70° C. for 18-22 h to obtain the second material;

(6) mixing the second material with the temperature of not higher than 28° C. with petroleum ether for precipitation, and drying the precipitate, wherein the weight ratio of the second material to the petroleum ether is 1:0.83-1.2.

Preferably, in the step (3), the drying conditions at least satisfy: the temperature is 50-60° C., and the time is 4-6 h.

The inventor finds that the amphiphilic block polymer obtained by the preparation method provided by the invention can be used as a high-quality ultralow-permeability agent, and further enables the drilling fluid to have more excellent capability of reducing the permeability of the temporary plugging layer.

As mentioned above, the fourth aspect of the present invention provides the application of the amphiphilic block polymer according to the first aspect described above in the drilling fluid.

In the invention, preferably, in the application, the polymer is used as an ultralow-permeability agent of the intelligent temporary plugging water-based drilling fluid.

In the application of the aforementioned polymer as the ultralow-permeability agent of the intelligent temporary plugging water-based drilling fluid, the specific application method is the technology well known to those skilled in the art, the invention is not described in detail herein, and those skilled in the art should not be construed as limiting the invention.

When the polymer of the present invention is used as an ultralow-permeability agent of the intelligent temporary plugging water-based drilling fluid, the polymer can be self-assembled into nano-micron-scale deformable micelles, the micelles can form supermolecule aggregates with a wide particle size range by self-aggregation, and the temporary plugging layer gaps formed in pore and throats by plugging materials such as bridging particles can be fully filled under the condition of not determining the pore and throat size and distribution of the reservoir, and the permeability of temporary plugging layer is greatly reduced.

As described above, the fifth aspect of the present invention provides an intelligent temporary plugging water-based drilling fluid, which contains two or more of the following components stored in a mixed manner or independently:

water, sodium bentonite, Pac-Lv, the ultralow-permeability agent, calcium carbonate, one-way plugging agent, white asphalt and barite;

the ultralow-permeability agent is the amphiphilic block polymer of the first aspect;

wherein the content of the sodium bentonite is 0.5 parts to 3 parts by weight relative to 100 parts by weight of water; the content of the ultralow-permeability agent is 0.5 parts to 3 parts by weight; the content of the calcium carbonate is 2 parts to 8 parts by weight; the content of the one-way plugging agent is 1 part to 5 parts by weight; the content of the white asphalt is 1 part to 5 parts by weight; the content of the barite is 60 parts to 120 parts by weight; and, the content of Pac-Lv is 1 wt % to 3 wt % based on the total weight of the drilling fluid.

Preferably, wherein the content of the sodium bentonite is 1 part to 2 parts by weight relative to 100 parts by weight of water; the content of the ultralow-permeability agent is 1 part to 2 parts by weight; the content of the calcium carbonate is 4 parts to 6 parts by weight; the content of the one-way plugging agent is 2 parts to 3 parts by weight; the content of the white asphalt is 2 parts to 3 parts by weight; the content of the barite is 80 parts to 100 parts by weight; and, the content of Pac-Lv is 1 wt % to 2 wt % based on the total weight of the drilling fluid.

The inventor found that the drilling fluid provided in the above preferred embodiment has a better ability to reduce the permeability of the temporary plugging layer, while having good rheological properties.

In the present invention, it should be noted that the water in the drilling fluid is used as a solvent, and the water may be pure distilled water and/or deionized water, or may be a mixed solvent containing distilled water and/or deionized water, and those skilled in the art should not be construed as limiting the present invention.

In the invention, the Pac-Lv is polyanionic cellulose for petroleum drilling. Illustratively, the Pac-Lv may be a Pac-Lv offered by Tianjin Samite chemical Co., Ltd under the designation SUMMIT.

Preferably, the one-way plugging agent is plant fiber or lignin. Illustratively, the lignin one-way plugging agent may be a commercial product supplied by Henan Mingtai chemical Co., Ltd under the designation DF-1.

As mentioned above, the sixth aspect of the present invention provides a method for preparing the drilling fluid of the fifth aspect, the method comprising: mixing the components of the drilling fluid according to the fifth aspect.

Preferably, the mixing method comprises: mixing water, sodium bentonite, Pac-Lv, ultralow-permeability agent, calcium carbonate, one-way plugging agent, white asphalt and barite in sequence.

According to a particularly preferred embodiment, the step of mixing the components of the drilling fluid according to the fifth aspect above comprises:

(a-1) carrying out first mixing on water and sodium bentonite to obtain the first mixed material;

(a-2) carrying out second mixing on the first mixed material and Pac-Lv to obtain the second mixed material;

(a-3) carrying out third mixing on the second mixed material and ultralow-permeability agent to obtain the third mixed material;

(a-4) carrying out fourth mixing on the third mixed material and calcium carbonate to obtain the fourth mixed material;

(a-5) carrying out fifth mixing on the fourth mixed material and one-way plugging agent to obtain the fifth mixed material;

(a-6) carrying out sixth mixing on the fifth mixed material and white asphalt to obtain the sixth mixed material;

(a-7) carrying out seventh mixing on the sixth mixed material and barite to obtain the seventh mixed material.

Preferably, the conditions of the first mixing, the second mixing, the third mixing, the fourth mixing, the fifth mixing, the sixth mixing, and the seventh mixing each independently satisfy: the stirring speed is 8000-15000 rpm, and the mixing time is 3-20 min. More preferably, the conditions of the first mixing, the second mixing, the third mixing, the fourth mixing, the fifth mixing, the sixth mixing, and the seventh mixing each independently satisfy: the stirring speed is 10000-12000 rpm, and the mixing time is 5-10 min.

In the present invention, there is no particular limitation on the preparation method of the drilling fluid, and the preparation method known to those skilled in the art can be adopted, and the present invention is not described herein in detail, and the present invention exemplifies a specific operation, and those skilled in the art should not be construed as limiting the present invention.

The present invention will be described in detail below by way of examples.

In the following examples, unless otherwise specified, the experimental instruments and raw materials are commercially available.

Experimental instruments

Six-speed viscometer: purchased from Qingdao Tongchun Petroleum instruments Co., Ltd.

Drilling fluid water loss determinator: purchased from Qingdao Tongchun Petroleum instruments Co., Ltd.

Raw materials

Sodium bentonite: purchased from Hangzhou Pingshan Bentonite Co., Ltd under the designation BT-1888.

Pac-Lv: purchased from Tianjin Samite chemical Co., Ltd under the designation SUMMIT.

Calcium carbonate: analytically pure.

One-way plugging agent: the lignin one-way plugging agent is purchased from Henan Mingtai chemical Co., Ltd.

White asphalt: purchased from Beijing Peikangjiaye technology development Co., Ltd.

Barite: purchased from Lingshou Shengya mineral products Co., Ltd.

Raw materials for preparing the ultralow-permeability agent:

Styrene: purchased from Guangzhou Liqing trading Co., Ltd.

Maleic anhydride: purchased from Zibo Xinrong chemical technology Co., Ltd.

Acrylamide: purchased from Jinan Hengcheng new materials Co., Ltd.

Chain transfer agent: 4-cyano-(thiobenzoic) pentanoic acid, available from Annaiji chemical company.

Initiator: azobisisobutyronitrile, analytically pure.

Solvent: tetrahydrofuran, analytically pure.

Precipitant: petroleum ether, analytically pure.

In the following examples, the room temperature was 25±1° C. unless otherwise specified.

In the following examples, the test methods for the properties involved are as follows:

1. Evaluation of Basic Performance of Drilling Fluid

The method comprises the steps of taking 300 mL of drilling fluid, measuring the Apparent Viscosity (AV), the Plastic Viscosity (PV), the Yield Point (YP), $\phi 6$ and $\phi 3$ of the drilling fluid by using the six-speed viscometer, and measuring the API Filtration Loss ($FLA_{API}$) of base fluid of the drilling fluid by using the drilling fluid water loss determinator.

The specific determination method is as follows: the drilling fluid to be measured is poured into the viscosity measuring cup, and $\phi 600$ and $\phi 300$ are sequentially read by using the six-speed viscometer at room temperature.

The AV is calculated as follows: $AV=0.5\times\phi 600$

The PV is calculated as follows: $PV=\phi 600-\phi 300$

The Yield Point (YP) is calculated as follows: $YP=0.51\times(2\times\phi 300-\phi 600)$ Pouring the drilling fluid to be measured into the filter loss measuring cup, adding a sealing ring and covering the API filter paper, sealing it by using a filter screen, introducing nitrogen, measuring the total volume of the drilling fluid filtrate within 7.5 min at room temperature under the pressure of 0.69 MPa, and multiplying by 2 to obtain $FL_{API}$.

2. Evaluation of Plugging Effect of Drilling Fluid 5 kinds of artificial cores with similar porosity and different permeability are adopted, the permeability is respectively $150-250*10^{-3}$ $\mu m^2$, $350-450*10^{-3}$ $\mu m^2$, $550-650*10^{-3}$ $\mu m^2$, $750-850*10^{-3}$ $\mu m^2$ and $950-1050*10^{-3}$ $\mu m^2$ from low to high, and the plugging effect evaluation is respectively carried out on the artificial cores by using the intelligent temporary plugging water-based drilling fluid.

The plugging experimental conditions are as follows: the temperature is room temperature, the pressure difference is 3.5 Mpa, the shearing rate is 100 $s^{-1}$, and the plugging time is 30 min. And respectively measuring the core permeability before plugging and the core permeability after plugging, calculating the plugging rate and the average plugging rate, and evaluating the intelligent plugging effect.

The core plugging rates with different permeabilities of the drilling fluid are calculated according to the following formula:

$F_{150-250}$=(permeability after plugging−permeability before plugging)/permeability before plugging*100%;

$F_{350-450}$=(permeability after plugging−permeability before plugging)/permeability before plugging*100%;

$F_{550-650}$=(permeability after plugging−permeability before plugging)/permeability before plugging*100%;

$F_{750-850}$=(permeability after plugging−permeability before plugging)/permeability before plugging*100%;

$F_{950-1050}$=(permeability after plugging−permeability before plugging)/permeability before plugging*100%.

The average plugging rate of the drilling fluid is calculated according to the following formula:

$F_{average}=(F_{150-250}+F_{350-450}+F_{550-650}+F_{750-850}+F_{950-1050})/5.$

Preparation Example 1: The Preparation Example is Used for Preparing the Ultralow-Permeability Agent AA-1

Weighing 5 g of styrene, 0.1 g of 4-cyano-(thiobenzoic) pentanoic acid and 0.02 g of azobisisobutyronitrile, mixing in a three-neck flask, vacuumizing, filling with nitrogen, and stirring at 60° C. for 20 h to obtain the macromolecular chain transfer agent;

mixing 2 g of macromolecular chain transfer agent with 6.24 g of styrene, 5.88 g of maleic anhydride, 8.52 g of acrylamide and 0.06 g of azobisisobutyronitrile, dissolving in 200 mL of tetrahydrofuran, vacuumizing and filling with nitrogen, and stirring for 20 h at 60° C. to obtain the mixture I;

cooling the mixture I to room temperature, then mixing with 20 g of petroleum ether for precipitation, and drying at 50° C. for 4 h to obtain the ultralow-permeability agent AA-1.

Preparation Example 2: The Preparation Example is Used for Preparing the Ultralow-Permeability Agent AA-2

Weighing 5 g of styrene, 0.2 g of 4-cyano-(thiobenzoic) pentanoic acid and 0.04 g of azobisisobutyronitrile, mixing in a three-neck flask, vacuumizing, filling with nitrogen, and stirring at 40° C. for 16 h to obtain the macromolecular chain transfer agent;

mixing 2 g of macromolecular chain transfer agent with 5.8 g of styrene, 5 g of maleic anhydride, 9.8 g of acrylamide and 0.06 g of azobisisobutyronitrile, dissolving in 200 mL of tetrahydrofuran, vacuumizing and filling with nitrogen, and stirring for 16 h at 40° C. to obtain the mixture II;

cooling the mixture II to room temperature, then mixing with 18.8 g of petroleum ether for precipitation, and drying at 50° C. for 4 h to obtain the ultralow-permeability agent AA-2.

Preparation Example 3: The Preparation Example is Used for Preparing the Ultralow-Permeability Agent AA-3

Weighing 5 g of styrene, 0.15 g of 4-cyano-(thiobenzoic) pentanoic acid and 0.03 g of azobisisobutyronitrile, mixing in a three-neck flask, vacuumizing, filling with nitrogen, and stirring at 80° C. for 24 h to obtain the macromolecular chain transfer agent;

mixing 2 g of macromolecular chain transfer agent with 7 g of styrene, 5.5 g of maleic anhydride, 8 g of acrylamide and 0.06 g of azobisisobutyronitrile, dissolving in 200 mL of tetrahydrofuran, vacuumizing and filling with nitrogen, and stirring for 24 h at 80° C. to obtain the mixture III;

cooling the mixture III to room temperature, then mixing with 27 g of petroleum ether for precipitation, and drying at 50° C. for 4 h to obtain the ultralow-permeability agent AA-3.

Example 1: The Example is Used or Preparing the Intelligent Temporary Plugging Water-Based Drilling Fluid BB-1

The formulation of the drilling fluid is specified in Table 1; mixing the components of the drilling fluid at room temperature, specifically:

(a-1) carrying out first mixing on water and sodium bentonite to obtain the first mixed material;
(a-2) carrying out second mixing on the first mixed material and Pac-Lv to obtain the second mixed material;
(a-3) carrying out third mixing on the second mixed material and ultralow-permeability agent to obtain the third mixed material;
(a-4) carrying out fourth mixing on the third mixed material and calcium carbonate to obtain the fourth mixed material;
(a-5) carrying out fifth mixing on the fourth mixed material and one-way plugging agent to obtain the fifth mixed material;
(a-6) carrying out sixth mixing on the fifth mixed material and white asphalt to obtain the sixth mixed material;
(a-7) carrying out seventh mixing on the sixth mixed material and barite to obtain the seventh mixed material;
the conditions for each mixing were the same: the time is 8 min, and the stirring speed is 11000 rpm. And obtaining the intelligent temporary plugging water-based drilling fluid BB-1.

The rest of the examples were carried out in a similar manner to Example 1, except that the formulations of the drilling fluids were different from that of Example 1, the specific formulations are given in Table 1, and the rest were the same as Example 1, and the names of the drilling fluids prepared are given in Table 1.

TABLE 1

|  | Example 1 | Example 2 | Example 3 | Example 4 | Comparative example 1 |
|---|---|---|---|---|---|
| Water/g | 100 | 100 | 100 | 100 | 100 |
| Sodium bentonite/g | 2 | 1 | 3 | 2 | 2 |
| Pac-Lv/g | 2.13 | 2 | 3 | 2.13 | 2.12 |
| Ultralow-permeability agent |  |  |  |  |  |
| Dosage/g | 1 | 2 | 3 | 0.5 | / |
| Species | AA-1 | AA-2 | AA-3 | AA-1 | / |
| Calcium carbonate/g | 5 | 4 | 8 | 5 | 5 |
| One-way plugging agent/g | 3 | 2 | 5 | 3 | 3 |
| White asphalt/g | 2 | 3 | 5 | 2 | 2 |
| Barite/g | 100 | 80 | 120 | 100 | 100 |
| Name | BB-1 | BB-2 | BB-3 | BB-4 | DBB-1 |

Test Example

1. Evaluation of Basic Performance of Drilling Fluid

The drilling fluids prepared in the above examples were tested for each of their basic properties, and the present invention provides exemplary test results for the following examples, as shown in Table 2.

TABLE 2

| Number | AV/mPa · s | PV/mPa · s | YP/Pa | $\phi 6$ | $\phi 3$ | $FL_{API}$/mL |
|---|---|---|---|---|---|---|
| Example 1 | 36.5 | 28 | 8.69 | 6 | 5 | 3.5 |
| Example 2 | 39.5 | 29 | 10.73 | 8 | 6 | 2.5 |
| Example 3 | 43.5 | 32 | 11.75 | 11 | 9 | 1.7 |
| Example 4 | 35.0 | 27 | 8.18 | 5 | 4 | 4.1 |
| Comparative example 1 | 32.5 | 27 | 5.62 | 3 | 2 | 7.2 |

From the above results, it can be seen that the ultralow-permeability agents were added to Examples 1 to 4, and the fluid loss of each example was lower than that of Comparative example 1 because of the plugging effect of the permeability agents. Meanwhile, the Yield Point, $\phi 6$ and $\phi 3$ of Examples 1 to 4 was higher than that of Comparative example 1, which shows that the permeability agent has the gel-improving effect.

In the examples, Example 2 has highergel strength, lower fluid loss and similar viscosity than Example 1, while Example 2 in the formulation only adds more permeability agent than Example 1, and the other treating agents are added in the same amount, which indicates that the tackifying effect of the permeability agent is weak; in Example 3, the amount of the permeability agent is the largest, and more plugging materials, barite and the like are added, so that the viscosity is the highest, the gel strength is the largest, and the filtration loss is the lowest; in Example 4, the amount of the permeability agent is the smallest, the viscosity is lower, the gel strength is lower, and the fluid loss is larger.

2. Evaluation of Plugging Effect of Drilling Fluid

The drilling fluids prepared in the above examples were tested for plugging effect, respectively, and the present invention illustratively provides the test results of the following examples, as shown in Table 3.

TABLE 3

| Number | $F_{150-250}$ | $F_{350-450}$ | $F_{550-650}$ | $F_{750-850}$ | $F_{950-1050}$ | $F_{average}$ |
|---|---|---|---|---|---|---|
| Example 1 | 89.2% | 88.0% | 93.3% | 89.7% | 89.4% | 89.9% |
| Example 2 | 91.3% | 89.9% | 93.4% | 91.0% | 90.9% | 91.3% |
| Example 3 | 96.6% | 96.2% | 96.9% | 95.9% | 96.2% | 96.4% |
| Example 4 | 83.1% | 86.1% | 88.8% | 83.2% | 85.1% | 85.3% |
| Comparative example 1 | 72.1% | 79.2% | 81.0% | 73.1% | 78.9% | 76.9% |

From the results, it can be seen that Comparative example 1 does not contain a permeability agent, only contains various plugging agents, and the formed plugging layer has a certain plugging effect on rock cores with different permeability; in Example 1, the ultralow-permeability agent is added, so that the plugging rate of the drilling fluid to the rock cores with each permeability is improved by about 10%, which indicates that the permeability agent can be self-adaptive to pore and throats with different sizes, and the pores of the plugging layer are effectively filled, so that the permeability is lower; by continuously increasing the using amount of the permeability agent, the plugging rate of the rock cores in Example 2 and 3 is continuously increased to be more than 90%; in Example 4, the amount of the permeability agent is less than that in Example 1, and the plugging effect is the worst in the examples, but still better than that in Comparative example 1 without the permeability agent.

In conclusion, when the amphiphilic block polymer provided by the invention is used as the ultralow-permeability agent of the intelligent temporary plugging water-based drilling fluid, the amphiphilic block polymer can be self-assembled into nano-micron-scale deformable micelles, the micelles can self-aggregate to form supermolecule aggregates with a wide particle size range, and the temporary plugging layer gaps formed in pore and throats by plugging materials such as bridging particles and the like can be fully filled under the condition that the size and distribution of the pore and throats of reservoirs are not required to be clear, the permeability of the drilling fluid is greatly reduced, and the amphiphilic block polymer is weak in tackifying effect, has a gel-improving effect and can improve the rheological property of the drilling fluid.

The preferred embodiments of the present invention have been described above in detail, but the present invention is not limited thereto. Within the scope of the technical idea of the present invention, many simple modifications can be made to the technical solution of the present invention, including various technical features being combined in any other suitable way, and these simple modifications and combinations should also be regarded as the disclosure of the present invention, and all fall within the scope of the present invention.

The invention claimed is:

1. An intelligent temporary plugging type water-based drilling fluid, wherein the drilling fluid comprising:
   water, sodium bentonite, Pac-Lv, the ultralow-permeability agent, calcium carbonate, one-way plugging agent, white asphalt and barite;
   wherein the content of the sodium bentonite is 0.5 parts to 3 parts by weight relative to 100 parts by weight of water; the content of the ultralow-permeability agent is 0.5 parts to 3 parts by weight; the content of the calcium carbonate is 2 parts to 8 parts by weight; the content of the one-way plugging agent is 1 part to 5 parts by weight; the content of the white asphalt is 1 part to 5 parts by weight; the content of the barite is 60 parts to 120 parts by weight;
   the ultralow-permeability agent is the amphiphilic block polymer ultralow-permeability agent an amphiphilic block polymer ultralow-permeability agent, wherein the permeability agent comprising structural unit A, structural unit B and structural unit C, the structural unit A is provided by styryl hydrophobic monomer, the structural unit B is provided by maleic anhydride, and the structural unit C is provided by acrylamide;
   the styryl hydrophobic monomer is selected from at least one of styrene, a-methyl styrene, 2-methyl styrene, 3-methyl styrene and 4-methyl styrene;
   the content of the structural unit A is 32 wt % to 44 wt % based on the total weight of the ultralow-permeability agent; the content of the structural unit B is 22 wt % to 28 wt %; the content of the structural unit C is 33 wt % to 40 wt %;
   the ultralow-permeability agent is the permeability agent prepared by a method comprising the steps of:
   in the presence of protective gas,
   (1) the weight ratio of the dosage is 1:0.02-0.04:0.004-0.008 of the styryl hydrophobic monomer I, the chain transfer agent contact with the initiator to carry out the first reaction to obtain the first intermediate;
   (2) in the presence of a solvent, contacting the first intermediate with the styryl hydrophobic monomer II, maleic anhydride, acrylamide and the initiator to perform the second reaction to obtain the second intermediate, wherein the first intermediate, the styryl hydrophobic monomer II, the maleic anhydride and the acrylamide are used in the weight ratio of 1:2.9-3.5:2.5-3.0:4.0-4.9;
   (3) contacting the second intermediate with the precipitant to effect precipitation; the styryl hydrophobic monomer I and the styryl hydrophobic monomer II provide the structural unit A of the amphiphilic block polymer ultralow-permeability agent.

2. The drilling fluid according to claim 1, wherein the content of the sodium bentonite is 1 part to 2 parts by weight relative to 100 parts by weight of water; the content of the ultralow-permeability agent is 1 part to 2 parts by weight; the content of the calcium carbonate is 4 parts to 6 parts by weight; the content of the one-way plugging agent is 2 parts to 3 parts by weight; the content of the white asphalt is 2 parts to 3 parts by weight; the content of the barite is 80 parts to 100 parts by weight.

3. The drilling fluid according to claim 1, wherein the content of Pac-Lv is 1 wt % to 3 wt % based on the total weight of the drilling fluid.

4. The drilling fluid according to claim 3, wherein the content of Pac-Lv is 1 wt % to 2 wt % based on the total weight of the drill.

* * * * *